(12) United States Patent
Rowan et al.

(10) Patent No.: US 9,556,844 B2
(45) Date of Patent: Jan. 31, 2017

(54) NOZZLE WITH CONTOURED ORIFICE SURFACE AND METHOD OF MAKING SAME

(71) Applicant: Caterpillar Inc., Peoria, IL (US)

(72) Inventors: Matthew I. Rowan, Chillicothe, IL (US); Lucas Burger, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 22 days.

(21) Appl. No.: 14/622,488

(22) Filed: Feb. 13, 2015

(65) Prior Publication Data
US 2016/0237971 A1 Aug. 18, 2016

(51) Int. Cl.
| F02M 61/00 | (2006.01) |
| F02M 61/18 | (2006.01) |
| F02M 47/02 | (2006.01) |
| F02M 51/06 | (2006.01) |
| B22D 23/00 | (2006.01) |
| B05B 1/30 | (2006.01) |
| B05B 1/02 | (2006.01) |
| B05B 1/26 | (2006.01) |
| B33Y 10/00 | (2015.01) |
| B33Y 80/00 | (2015.01) |

(52) U.S. Cl.
CPC ............ *F02M 61/1806* (2013.01); *B05B 1/02* (2013.01); *B05B 1/262* (2013.01); *B05B 1/265* (2013.01); *B05B 1/267* (2013.01); *B05B 1/3046* (2013.01); *B22D 23/00* (2013.01); *F02M 47/02* (2013.01); *F02M 47/025* (2013.01); *F02M 51/061* (2013.01); *B33Y 10/00* (2014.12); *B33Y 80/00* (2014.12)

(58) Field of Classification Search
CPC .. F02M 61/1806; F02M 47/025; F02M 47/04; F02M 51/061; B22D 23/00; B33Y 10/00; B33Y 80/00; B05B 1/262; B05B 1/265; B05B 1/267; B05B 1/3046; B05B 1/02
USPC .................. 239/500, 502, 522, 533.8, 533.9, 533.11,239/533.12, 584, 585.1, 596, 601
See application file for complete search history.

(56) References Cited

U.S. PATENT DOCUMENTS

| 4,221,195 | A | | 9/1980 | Hafele et al. |
| 5,024,193 | A | | 6/1991 | Graze, Jr. |
| 5,383,597 | A | * | 1/1995 | Sooriakumar ............ B05B 1/34 239/584 |
| 5,924,402 | A | | 7/1999 | Regueiro |

(Continued)

FOREIGN PATENT DOCUMENTS

| EP | 2700796 A1 | 2/2014 |
| FR | 1358910 A | 4/1964 |
| WO | WO 2009/130376 A1 | 10/2009 |

*Primary Examiner* — Steven J Ganey
(74) *Attorney, Agent, or Firm* — Leydig, Voit & Mayer, Ltd.

(57) ABSTRACT

A nozzle for a member of a fuel combustion system of an engine includes a hollow nozzle body. The nozzle body includes an outer surface, an inner surface, and an orifice surface. The outer surface defines an outer opening. The inner surface defines an interior chamber and an inner opening. The orifice surface defines an orifice passage extending between, and in communication with, the outer opening and the inner opening. The orifice passage is in communication with the interior chamber via the inner opening. The orifice surface includes a boundary surface and a protrusion. The protrusion projects from the boundary surface radially inwardly into the orifice passage.

13 Claims, 6 Drawing Sheets

(56) References Cited

U.S. PATENT DOCUMENTS

| | | | |
|---|---|---|---|
| 5,924,634 A * | 7/1999 | Arndt | B05B 1/34 239/533.12 |
| 5,934,244 A | 8/1999 | Walenta et al. | |
| 6,575,192 B1 | 6/2003 | Shaffer | |
| 6,644,565 B2 * | 11/2003 | Hockenberger | F02M 61/1833 239/533.12 |
| 6,694,944 B2 | 2/2004 | Agama et al. | |
| 6,708,905 B2 * | 3/2004 | Borissov | F02B 43/00 239/584 |
| 6,739,289 B2 | 4/2004 | Hiltner et al. | |
| 6,854,439 B2 | 2/2005 | Regueiro | |
| 6,883,468 B2 | 4/2005 | Lehman | |
| 7,100,567 B1 | 9/2006 | Bailey et al. | |
| 7,216,623 B2 | 5/2007 | Teraji et al. | |
| 7,398,743 B2 | 7/2008 | Fiveland | |
| 7,438,043 B2 | 10/2008 | Shiraishi et al. | |
| 7,438,241 B2 * | 10/2008 | Goenka | F02M 61/1853 239/500 |
| 7,513,234 B1 | 4/2009 | Baldwin et al. | |
| 7,770,552 B2 | 8/2010 | Schultz | |
| 8,104,444 B2 | 1/2012 | Schultz | |
| 8,544,770 B2 * | 10/2013 | Limmer | F02M 61/1806 239/584 |
| 8,720,411 B2 | 5/2014 | Redtenbacher et al. | |
| 8,726,878 B2 | 5/2014 | Klinkner | |
| 2005/0000484 A1 | 1/2005 | Schultz et al. | |
| 2005/0211217 A1 | 9/2005 | Boley et al. | |
| 2006/0219210 A1 | 10/2006 | Bailey et al. | |
| 2007/0236122 A1 | 10/2007 | Borror | |
| 2008/0296412 A1 | 12/2008 | Gibson et al. | |
| 2010/0326400 A1 | 12/2010 | Hayes, Jr. | |
| 2013/0000598 A1 | 1/2013 | Tokuoka et al. | |
| 2013/0160734 A1 | 6/2013 | Redtenbacher et al. | |
| 2014/0196686 A1 | 7/2014 | Coldren et al. | |

\* cited by examiner

NOZZLE WITH CONTOURED ORIFICE SURFACE AND METHOD OF MAKING SAME

TECHNICAL FIELD

This patent disclosure relates generally to a fuel combustion system for an internal combustion engine and, more particularly, to a nozzle of a member of a fuel combustion system for an internal combustion engine.

BACKGROUND

One type of internal combustion engines typically employ a number of cylinders which compress a fuel and air mixture such that upon firing of a spark plug associated with each cylinder, the compressed mixture ignites. The expanding combustion gases resulting therefrom move a piston within the cylinder. Upon reaching an end of its travel in one direction within the cylinder, the piston reverses direction to compress another volume of the fuel and air mixture. The resulting mechanical kinetic energy can be converted for use in a variety of applications, such as, propelling a vehicle or generating electricity, for example.

Another type of internal combustion engine, known as a compression ignition engine, uses a highly-compressed gas (e.g., air) to ignite a spray of fuel released into a cylinder during a compression stroke. In such an engine, the air is compressed to such a level as to achieve auto-ignition of the fuel upon contact between the air and fuel. The chemical properties of diesel fuel are particularly well suited to such auto-ignition.

The concept of auto-ignition is not limited to diesel engines, however, and has been employed in other types of internal combustion engines as well. For example, a self-igniting reciprocating internal combustion engine can be configured to compress fuel in a main combustion chamber via a reciprocating piston. In order to facilitate starting, each main combustion chamber is associated with a prechamber, particularly useful in starting cold temperature engines. Fuel is injected into not only the main combustion chamber, but also the combustion chamber of the prechamber, as well, such that upon compression by the piston, a fuel and air mixture is compressed in both chambers. A glow plug or other type of heater is disposed within the prechamber to elevate the temperature therein sufficiently to ignite the compressed mixture. The combustion gases resulting from the ignition in the prechamber are then communicated to the main combustion chamber.

Other types of internal combustion engines use natural gas as the fuel source and include at least one piston reciprocating within a respective cylinder. A spark plug is positioned within a cylinder head associated with each cylinder and is fired on a timing circuit such that upon the piston reaching the end of its compression stroke, the spark plug is fired to thereby ignite the compressed mixture.

In still further types of internal combustion engines, prechambers are employed in conjunction with natural gas engines. Given the extremely high temperatures required for auto-ignition with natural gas and air mixtures, glow plugs or other heat sources such as those employed in typical diesel engines, can be ineffective. Rather, a prechamber is associated with each cylinder of the natural gas engine and is provided with a spark plug to initiate combustion within the prechamber which can then be communicated to the main combustion chamber. Such a spark-ignited, natural gas engine prechamber is provided in, for example, the 3600 series natural gas engines commercially available from caterpillar Inc. of Peoria, Ill.

Spark-ignited engines typically have very high component temperatures. The temperature is a result of the gas flow and gas temperature characteristics. In particular, the surfaces defining the orifices of the nozzle of a member of a fuel combustion system, such as a prechamber, for example, can be subjected to very high temperatures. In the case of a prechamber assembly, the high temperatures can be caused by the velocity of the fuel/air mixture entering the nozzle through the orifices and the ignition flame front discharged from the nozzle out through the orifices. As a result, the high temperatures to which the orifices are subjected can cause degradation of the nozzle and impair the function of the nozzle over time.

U.S. Patent Application Publication No. 2013/0000598 is entitled, "Divided-Chamber Gas Engine," and is directed to a gas engine that is configured to inject a combustion gas from an auxiliary combustion chamber through a plurality of nozzles, through which the auxiliary combustion chamber and a main combustion chamber are in communication with each other, so as to ignite a fuel in the main combustion chamber. An opening edge, at the auxiliary combustion chamber side, of each of the plurality of nozzles is formed to have a curved surface.

There is a continued need in the art to provide additional solutions to enhance the performance of a component of a fuel combustion system to improve its efficiency and useful life. For example, there is a continued need to protect the orifices of a nozzle of a prechamber assembly from the extreme temperature to which it can be subjected.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a nozzle for a member of a fuel combustion system of an engine. The nozzle includes a hollow nozzle body. The nozzle body includes an outer surface, an inner surface, and an orifice surface. The outer surface defines an outer opening. The inner surface defines an interior chamber and an inner opening. The orifice surface defines an orifice passage extending between, and in communication with, the outer opening and the inner opening.

The orifice passage is in communication with the interior chamber via the inner opening. The orifice surface includes a boundary surface and a protrusion. The protrusion projects from the boundary surface radially inwardly into the orifice passage.

In yet another embodiment, a method of making a nozzle for a member of a fuel combustion system of an engine is described. The method of making includes manufacturing a nozzle body. The nozzle body is hollow and includes an outer surface and an inner surface. The outer surface defines an outer opening. The inner surface defines an interior chamber and an inner opening.

An orifice surface is defined. The orifice surface defines an orifice passage extending between, and in communication with, the outer opening and the inner opening. The orifice passage is in communication with the interior chamber via the inner opening.

The orifice surface is defined such that the orifice surface includes a boundary surface and a protrusion. The protrusion projects from the boundary surface radially inwardly into the orifice passage.

Further and alternative aspects and features of the disclosed principles will be appreciated from the following detailed description and the accompanying drawings. As will be appreciated, the principles related to fuel combustion systems, nozzles for a member of a fuel combustion system of an engine, and methods of making nozzles for a member of a fuel combustion system of an engine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides embodiments of a nozzle for a member of a fuel combustion system of an engine. In embodiments, the member, such as a prechamber assembly or a fuel injector, for example, can be mounted to a cylinder head of an internal combustion engine. Exemplary engines include those used in vehicles, electrical generators, and pumps, for examples.

Embodiments of a nozzle constructed according to principles of the present disclosure can have an orifice configuration that helps to reduce the heat transfer between a flow of fuel mixture/flame front passing through the respective orifice of the nozzle and the nozzle body and to reduce the temperature within the orifice passages and the orifice bridges disposed around the nozzle body. In embodiments, the nozzle can include an orifice surface having at least one protrusion configured to modify a flow of a fuel mixture/flame front passing through the orifice passage defined by the orifice surface to help reduce at least one of the temperature within the orifice passage and the heat transfer between the flow of a fuel mixture/flame front and the boundary surface of the orifice surface. Embodiments of a nozzle constructed according to principles of the present disclosure can be made using additive manufacturing techniques.

In embodiments, a nozzle constructed according to principles of the present disclosure can include an orifice passage having at least one protrusion configured to modify fluid flow through the orifice passage relative to the same orifice passage without the protrusion(s). In embodiments, a nozzle constructed according to principles of the present disclosure can include an orifice passage having at least one protrusion configured to help control flow through the orifice passage such that the heat transfer between the flow of fuel mixture/flame front and the boundary surface of the orifice passage is reduced. In embodiments, the protrusion can be configured based upon computer modeling to enhance flow streamlines of the fuel mixture/flame front passing through the orifice passage.

In embodiments, a nozzle constructed according to principles of the present disclosure can be used in a suitable member of a fuel combustion system of an engine, such as, a fuel injector or a prechamber assembly, for example. In embodiments, a prechamber assembly including a nozzle constructed according to principles of the present disclosure can be associated with a supplemental fuel source adapted to direct a flow of fuel into the precombustion chamber of the prechamber assembly through a path other than via the main combustion chamber in the cylinder block with which the prechamber assembly is associated. In such embodiments, a control valve, such as a conventional check valve arrangement, can be provided to selectively permit the flow of fuel from the supplemental fuel source into the precombustion chamber of the prechamber assembly to further promote ignition within the precombustion chamber. In embodiments, the fuel of the supplemental fuel source can have a richer fuel/air ratio than the fuel/air ratio of the fuel supplied directly to the main combustion chamber with which the prechamber assembly is associated.

In embodiments, the ignited mixture within the prechamber is discharged through the rippled orifices of the nozzle as a flow of a flame front into the main combustion chamber with reduced heat transfer effects as a result of the protrusions projecting into the respective orifice passages. The flame area produced by a prechamber assembly constructed according to principles of the present disclosure can help improve combustion of a lean fuel mixture in the main combustion chamber of the cylinder with which it is associated.

Figure 1:
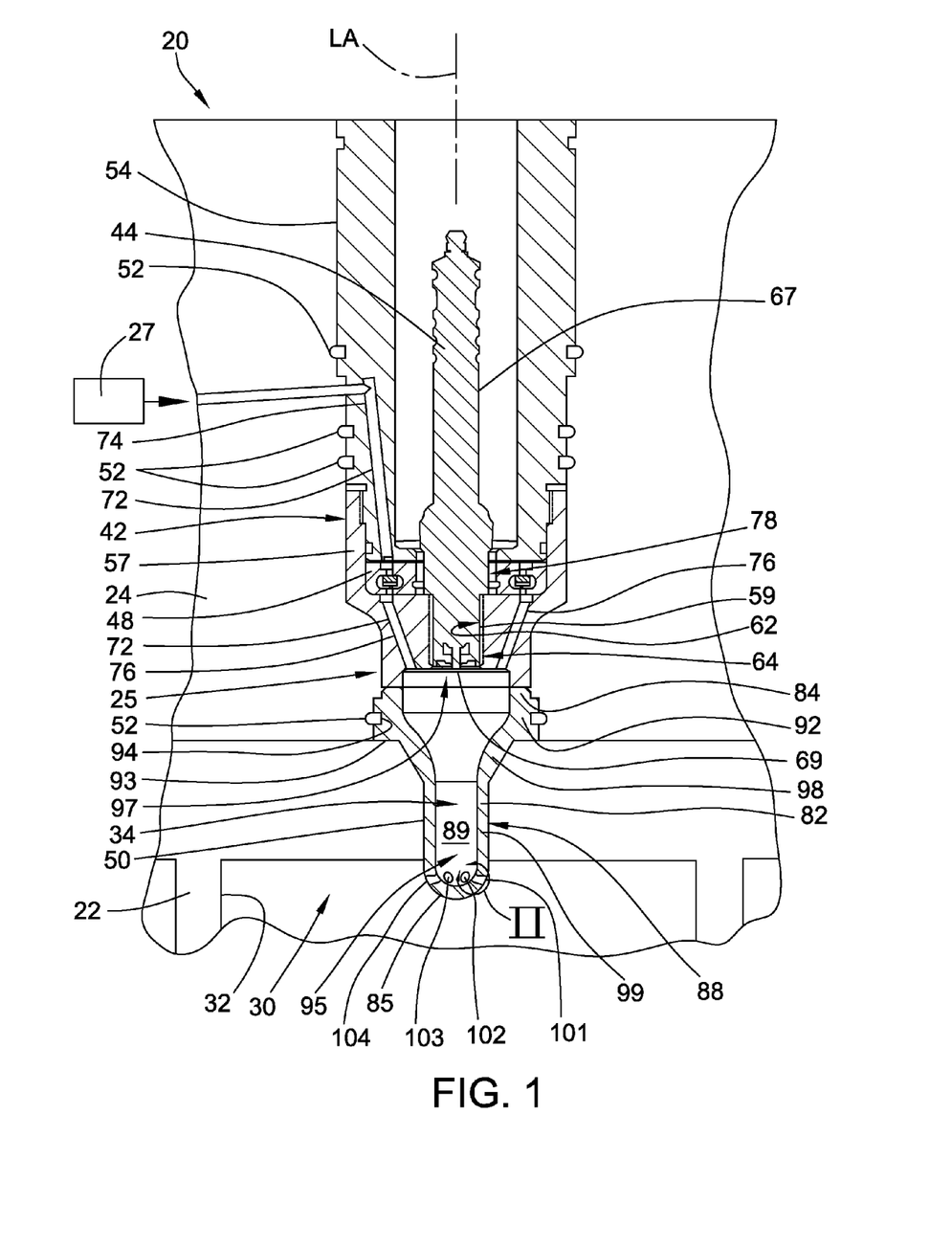
FIG. 1 is a diagrammatic, longitudinal cross-sectional view of an embodiment of a fuel combustion system constructed in accordance with principles of the present disclosure and including an embodiment of a prechamber assembly constructed in accordance with principles of the present disclosure.

Turning now to the FIGURES, there is shown in FIG. 1 an exemplary embodiment of a fuel combustion system 20 constructed in accordance with principles of the present disclosure. The fuel combustion system 20 can be used in any suitable internal combustion engine, such as an engine configured as part of an electrical generator or a pump, for example. The fuel combustion system 20 can be used with any suitable fuel with an appropriate fuel/air ratio. In embodiments, fuels with different ignition and burning characteristics and different specific fuel to air ratios can be used. The fuel combustion system 20 can include a cylinder block 22, a cylinder head 24, a prechamber assembly 25 having a nozzle 50 constructed in accordance with principles of the present disclosure, a supplemental fuel source 27, and a variety of other combustion devices, as will be appreciated by one skilled in the art.

Referring to FIG. 1, the cylinder block 22 defines, at least partially, a main combustion chamber 30. In embodiments, the cylinder block 22 can define a plurality of cylinders 32 (one of which is shown in FIG. 1) within which is defined the corresponding main combustion chamber 30. In embodiments, a cylinder liner can be disposed within each cylinder 32. The cylinder liner can be removably secured in the cylinder block 22.

The cylinder head 24 can be removably attached to the cylinder block 22 via suitable fasteners, such as a plurality of bolts, as will be appreciated by one skilled in the art. A gasket (not shown) can be interposed between the cylinder block 22 and the cylinder head 24 to seal the interface therebetween. The cylinder head 24 typically has bores machined for engine valves (not shown), e.g., inlet and exhaust valves, and other members of the fuel combustion system 20 (not shown), e.g., fuel injectors, glow plugs, sparks plugs, and combinations thereof, as will be appreciated by one skilled in the art. In other embodiments, the fuel combustion system 20 can include a fuel injector having a nozzle constructed according to principles of the present disclosure.

Each cylinder 32 of the cylinder block 22 can house a reciprocally movable piston (not shown), which is coupled to a crankshaft via a suitable transfer element (e.g., a piston rod or connecting rod). The piston is reciprocally movable within the cylinder 32 for compressing and thereby pressurizing the combustible mixture in the main combustion chamber 30 during a compression phase of the engine. In embodiments, the engine can be configured to have a suitable compression ratio suited for the intended purpose of the engine as will be understood by one skilled in the art.

In embodiments, at least one intake valve mechanism (not shown) and at least one exhaust valve mechanism (not shown) can be operatively positioned within the cylinder head 24 such that the intake valve and the exhaust valve are axially movable in the cylinder head 24. In embodiments, a mechanical valve train (e.g., including a cam, follower, and push rod mechanism) or other hydraulic and/or electric control device can be used in a conventional manner to selectively operate the intake valve mechanism and the exhaust valve mechanism. In particular, the inlet valve mechanism can be opened to admit a predetermined amount of a lean gaseous combustible mixture of fuel and air directly into the main combustion chamber 30 above the piston during an intake phase of the engine. The exhaust valve mechanism can be opened to permit the exhaust of the gases of combustion from the main combustion chamber 30 during an exhaust phase of the engine.

The cylinder head 24 and the cylinder block 22 can also define cooling passages therein that are configured to cool members of the fuel combustion system 20. In embodiments, any suitable cooling system can be placed in fluid communication with the cooling passages to circulate a coolant fluid through the cooling passages in the cylinder block 22 and the cylinder head 24.

The prechamber assembly 25 is removably secured in the cylinder head 24 such that the prechamber assembly 25 is in communication with the main combustion chamber 30. The prechamber assembly 25 defines a precombustion chamber 34, which is in communication with the main combustion chamber 30. The prechamber assembly 25 includes a prechamber housing 42, an ignition device 44 adapted to selectively ignite a fuel disposed in the precombustion chamber 34, a control valve 48, and the nozzle 50. The nozzle 50 and the prechamber housing 42 can be made from any suitable material, such as a suitable, heat-resistant metal. Suitable sealing devices 52, such as o-rings, for example, can be disposed between the prechamber assembly 25 and the cylinder head 24. In other embodiments, other sealing techniques, such as, press fit, metal seals, and the like, can be used.

The nozzle 50 and the prechamber housing 42 cooperate together to define the precombustion chamber 34 and to define a central longitudinal axis LA of the prechamber assembly 25. The nozzle 50 and the prechamber housing 42 include surfaces that are generally surfaces of revolution about the central longitudinal axis LA. The precombustion chamber 34 has a predetermined geometric shape and volume. In embodiments, the volume of the precombustion chamber 34 is smaller than the volume of the main combustion chamber 30. In some embodiments, the volume of the precombustion chamber 34 is in a range between about two and about five percent of the total uncompressed volume of the main combustion chamber 30.

In the illustrated embodiment, the prechamber housing 42 includes an upper member 54 and a lower member 57, which are threadingly secured together. In other embodiments, other types of engagement between the upper member 54 and the lower member 57 can be used, such as, welding, press fitting, and the like. The prechamber housing 42 is hollow and is adapted to receive the ignition device 44 therein.

The ignition device 44 is mounted to the prechamber housing 42. The illustrated lower member 57 of the prechamber housing 42 defines an ignition device bore 59 which has an internal threaded surface 62. The ignition device 44 has an external threaded surface 64 which is threadedly engaged with the internal threaded surface 62 of the ignition device bore 59. The ignition device bore 59 is in communication with the precombustion chamber 34.

In the illustrated embodiment, the ignition device 44 comprises a spark plug 67 with an electrode 69. The spark plug 67 is removably mounted to the prechamber housing 42 such that the electrode 69 is in communication with the precombustion chamber 34 and such that the electrode 69 is substantially aligned with the central longitudinal axis LA. The spark plug 67 is threadedly received in the ignition device bore 59 with the electrode 69 exposed to the precombustion chamber 34 by way of the ignition device bore 59. The spark plug 67 can be adapted to be electrically energized in a conventional manner.

In embodiments, at least one of the prechamber housing 42 and the nozzle 50 define a supplemental fuel passage 72. The supplemental fuel passage 72 is in communication with the precombustion chamber 34 and with the supplemental fuel source 27. In embodiments, the fuel of the supplemental fuel source 27 can have a richer fuel/air ratio than the fuel/air ratio of the fuel supplied directly to the main combustion chamber 30 with which the prechamber assembly 25 is associated.

In the illustrated embodiment of FIG. 1, the upper member 54 and the lower member 57 of the prechamber housing 42 both define the supplemental fuel passage 72. The illustrated upper segment defines a fuel passage entry segment 74. The illustrated lower member 57 of the prechamber housing 42 defines a plurality of precombustion chamber fuel passage segments 76 which are circumferentially arranged about the lower member 57 and in fluid communication with the fuel passage entry segment 74 via a control valve cavity 78 defined between the upper member 54 and the lower member 57.

The control valve 48 is disposed within the prechamber housing 42 and is adapted to selectively occlude the supplemental fuel passage 72 to prevent a flow of fuel from the supplemental fuel source 27 to the precombustion chamber 34. The illustrated control valve 48 is disposed within the control valve cavity 78 and is interposed between the fuel passage entry segment 74 and the precombustion chamber fuel passage segments 76. The control valve 48 can be adapted to selectively permit the flow of fuel from the supplemental fuel source 27 into the precombustion chamber 34 of the prechamber assembly 25 to further promote ignition within the precombustion chamber 34. The control valve 48 can be adapted to open and close with the engine's combustion cycle to prevent contamination of the fuel with exhaust and/or prevent leakage of fuel into the exhaust gases. The control valve 48 can be adapted to prevent the gas product of combustion to flow from the precombustion chamber 34 to the fuel passage entry segment 74 of the supplemental fuel passage 72 during the compression, combustion, and exhaust phases of the engine.

In embodiments, the control valve 48 can be any suitable control valve, such as a check valve assembly including a free-floating ball check having an open mode position— permitting the flow of the fuel from the supplemental fuel source 27 to the precombustion chamber 34—and a closed mode position—preventing gas flow from the supplemental fuel source 27 to the precombustion chamber 34. In other embodiments, the control valve 48 can be a shuttle type check valve. In the illustrated embodiment, the control valve 48 is similar in construction and function to the check valve shown and described in U.S. Pat. No. 6,575,192.

The nozzle 50 includes a nozzle body 82 having a mounting end 84 and a distal tip 85. The nozzle body 82 defines the central longitudinal axis LA which extends between the mounting end 84 and the distal tip 85. The nozzle body 82 is hollow and includes an outer surface 88 and an inner surface 89. The outer surface 88 and the inner surface 89 are both surfaces of revolution about the central longitudinal axis LA.

The mounting end 84 of the nozzle 50 is in abutting relationship with the lower member 57 of the prechamber housing 42. Any suitable technique can be used to provide a seal between the nozzle 50 and the lower member 57 of the prechamber housing 42, such as, o-rings, press fit, metal seals, gaskets, welding, and the like.

The mounting end 84 of the nozzle body 82 includes an annular flange 92 that defines a seat 93 which can be engaged with the cylinder block 22 and/or the cylinder head 24. The mounting end 84 of the nozzle body 82 defines an external circumferential groove 94 configured to receive a suitable sealing device 52 (e.g., an o-ring) therein for sealing.

The nozzle body 82 projects from the cylinder head 24 such that the distal tip 85 of the nozzle body 82 is disposed in the main combustion chamber 30. Any suitable sealing technique can be used to seal the interface between the nozzle 50 and the cylinder head 24 and/or the cylinder block 22, such as, a gasket, a taper fit, and/or a press fit to isolate fuel, combustion gases, and engine coolant therein.

The inner surface 89 of the nozzle body 82 defines an interior chamber 95 which is open to and in communication with a distal cavity 97 defined in the lower member 57 of the prechamber housing 42. The interior chamber 95 of the nozzle body 82 and the distal cavity 97 of the lower member 57 together define the precombustion chamber 34 of the prechamber assembly 25. The interior chamber 95 of the nozzle body 82 is open to the electrode 69 of the spark plug 67 and is in fluid communication with the supplemental fuel passage 72 via the precombustion chamber fuel passage segments 76 of the lower member 57.

The mounting end 84 of the nozzle body 82 is generally cylindrical. The nozzle body 82 includes a converging portion 98 disposed adjacent the mounting end 84 and a distal cylindrical portion 99 adjacent the distal tip 85. The distal cylindrical portion 99 has a smaller diameter than that of the mounting end 84.

The nozzle body 82 defines a plurality of orifices 101, 102, 103, 104 in the distal tip 85. The orifices 101, 102, 103, 104 are in communication with the interior chamber 95 of the nozzle body 82 and with the main combustion chamber 30 when the prechamber assembly 25 is installed in the cylinder head 24. The illustrated orifices 101, 102, 103, 104 are substantially identical to each other. Accordingly, it will be understood that the description of one orifice is applicable to the other orifices, as well.

The orifices 101, 102, 103, 104 are circumferentially arranged about the central longitudinal axis LA at substantially evenly-spaced angular positions. The orifices 101, 102, 103, 104 are respectively symmetrically disposed about the central longitudinal axis LA such that the orifices 101, 102, 103, 104 extend along substantially the same angle of inclination relative to the central longitudinal axis LA. In embodiments, the orifices 101, 102, 103, 104 can extend along a different angle of inclination relative to the central longitudinal axis LA. In still other embodiments, at least one of the orifices 101, 102, 103, 104 can extend along an angle of inclination relative to the central longitudinal axis LA that is different from at least one other of the orifices 101, 102, 103, 104.

Preferably, the orifices 101, 102, 103, 104 are configured such that the flow characteristics of a fuel/air mixture within the precombustion chamber in a region adjacent the electrode 69 of the spark plug is less turbulent and more laminar than that in the cylindrical portion 99 adjacent the distal tip 85 of the nozzle 50 where the orifices 101, 102, 103, 104 are located. The orifices 101, 102, 103, 104 can be configured such that flows of burning fuel respectively conveyed from the interior chamber 95 out through the orifices 101, 102, 103, 104 are controllably directed away from the nozzle body 82 in diverging relationship to each other, controllably expanding the burning gases away from the distal tip 85 of the nozzle 50 into the main combustion chamber 30 in order to facilitate the ignition and burning of the combustible mixture in the main combustion chamber 30 over a larger volume at the same time.

In embodiments, the nozzle body 82 can define any suitable number of orifices to achieve the desired swirl/mixing characteristics within the interior chamber 95 of the nozzle body 82 and the desired flame discharge pattern in the main combustion chamber 30 resulting from the combustion phase in the nozzle 50. For example, in the illustrated embodiment, the nozzle body includes six orifices circumferentially arranged about the central longitudinal axis LA at substantially evenly-spaced angular positions (about sixty degrees apart from each other). In other embodiments, the nozzle body 82 can define a different number of orifices, such as eight or twelve orifices circumferentially arranged about the central longitudinal axis LA at substantially evenly-spaced angular positions (about forty-five degrees and about thirty apart from each other, respectively). In still other embodiments, the nozzle body 82 can define yet a different number of cooperating orifices. In yet other embodiments, the nozzle body can define orifices that have variable spacing between at least two pairs of adjacent orifices.

Figure 2:
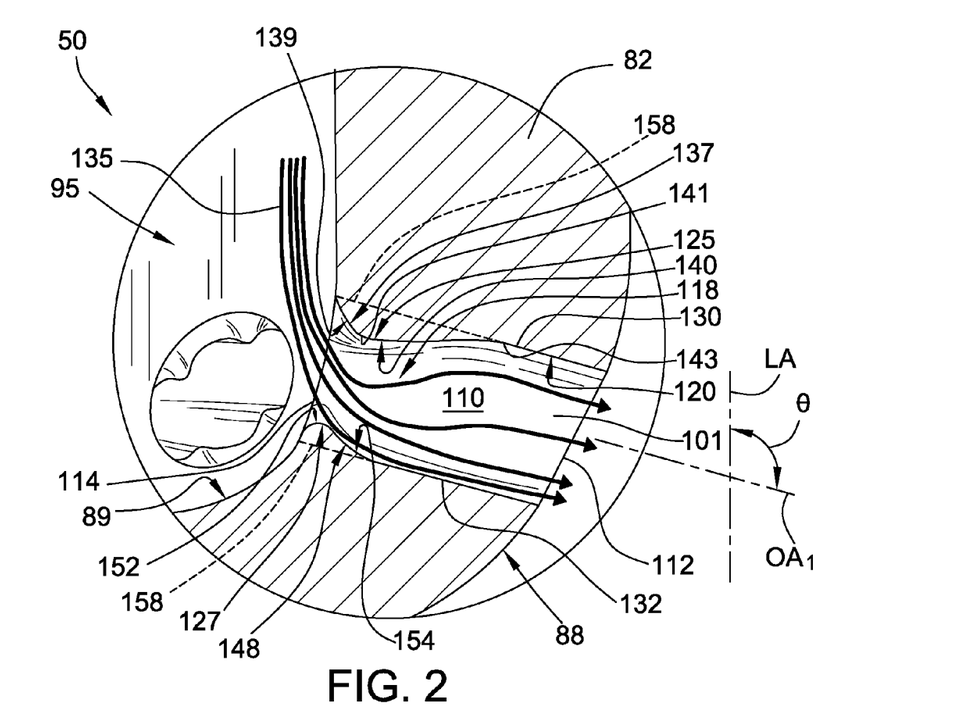
FIG. 2 is an enlarged, detail view of a nozzle constructed in accordance with principles of the present disclosure, as indicated by circle II in FIG. 1, and suitable for use in the prechamber assembly of FIG. 1.

Referring to FIG. 2, the first orifice 101 of the nozzle 50 is shown in axial cross section. It should be understood that the description of the first orifice 101 is applicable to the other orifices 102, 103, 104, as well.

The nozzle body 82 includes an orifice surface 110 that defines the orifice 101. The outer surface 88 defines an outer opening 112, and the inner surface 89 defines an inner opening 114. The orifice surface 110 defines an orifice passage 118 extending between, and in communication with, the outer opening 112 and the inner opening 114. The orifice passage 118 is in communication with the interior chamber 95 via the inner opening 114.

The orifice surface 110 includes a boundary surface 120, a first protrusion 125, and a second protrusion 127. The first protrusion 125 and the second protrusion 127 both project from the boundary surface 120 radially inwardly into the orifice passage 118. The first protrusion 125 and the second protrusion 127 are generally axially aligned and are both disposed adjacent the inner opening 114.

The illustrated boundary surface 120 is generally cylindrical and has an upper portion 130 and a lower portion 132. The illustrated boundary surface 120 comprises a symmetric surface of revolution about a first orifice axis $OA_1$. The first orifice axis $OA_1$ is disposed at the first angle of inclination $\Theta$ relative to the central longitudinal axis LA.

The first protrusion 125 is configured to divert a flow 135 of a fuel mixture/flame front entering the orifice passage 118 from the inner opening 114 radially away from the boundary surface 120. The first protrusion 125 includes a first protrusion passage surface 137 that is configured to divert the flow of the fuel mixture/flame front entering the orifice passage 118 radially away from the boundary surface 120. The illustrated first protrusion passage surface 137 includes a first inclined surface 139 and a second inclined surface 140. The first inclined surface 139 and the second inclined surface 140 are in converging relationship to each other and define a ridge 141 therebetween (see FIG. 3 also).

The first inclined surface 139 extends between the inner opening 114 and the ridge 141. The first inclined surface 139 is inclined away from the boundary surface 120, moving from the inner opening 114 to the ridge 141. The second inclined surface 140 extends between the ridge 141 and the boundary surface 120 at an intermediate edge 143 thereof.

The second inclined surface 140 is inclined toward the boundary surface 120, moving from the ridge 141 to the intermediate edge 143.

As shown in FIG. 2, the flow 135 of the fuel mixture/flame front entering the orifice passage 118 from the inner opening 114 tends to be diverted radially away from the boundary surface 120 by the first inclined surface 139 and the ridge 141. The second inclined surface 140 provides a gradual transition between the first protrusion 125 and the boundary surface 120 that helps enhance the flow streamlines of the flow 135 of the fuel mixture/flame front passing through the orifice passage 118.

The second protrusion 127 includes a second protrusion passage surface 148 having a portion that substantially conforms to the expected flow path of the flow 135 of the fuel mixture/flame front at the location of the second protrusion 127. The illustrated second protrusion passage surface 148 includes a convex surface 152 and a concave surface 154.

The convex surface 152 is disposed adjacent the inner opening 114. The illustrated convex surface 152 is curved. The concave surface 154 is contiguous with the convex surface and is disposed axially outward of the convex surface 152, moving from the inner opening 114 toward the outer opening 112. The illustrated concave surface 154 is curved. As shown in FIG. 2, the flow 135 of the fuel mixture/flame front entering the orifice passage 118 from the inner opening 114 tends to follow the shape of the concave surface 154 of the second protrusion 127.

In embodiments, the first protrusion 125 and the second protrusion 127 can be configured based upon computer modeling. For example, the first protrusion 125 can be configured based upon computer modeling to divert the flow 135 of the fuel mixture/flame front entering the orifice passage 118 radially away from the portion of the boundary surface 120 from which the first protrusion 125 projects. In embodiments, the second protrusion 127 can be configured based upon computer modeling to enhance flow streamlines of the flow 135 of the fuel mixture/flame front passing through the orifice passage 118. In embodiments, any suitable modeling technique, such as, computational fluid dynamics, for example, can be used to model an expected flow path of the flow 135 of the fuel mixture/flame front through the orifice 101 in question.

In embodiments, a baseline orifice passage 158 can be defined by a geometric projection of the boundary surface 120 between the outer opening 112 and the inner opening 114. The baseline orifice passage 158 can be used to iteratively reach a protrusion configuration to achieve a desired fluid flow result.

Figure 3:
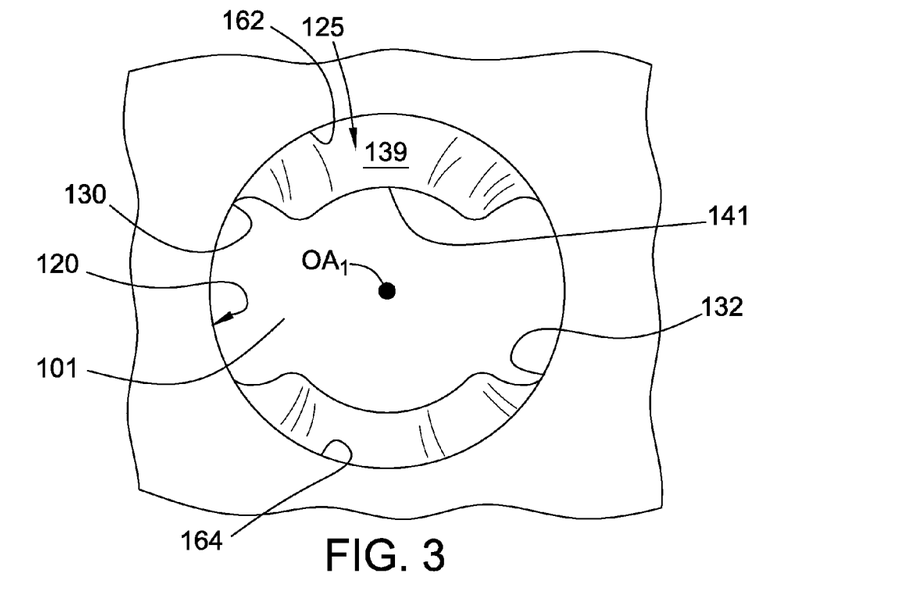
FIG. 3 is an axial end view of an orifice of the nozzle of FIG. 1, taken from an interior chamber of the nozzle.

Referring to FIG. 3, the first protrusion 125 projects from the upper portion 130 of the boundary surface 120. The first protrusion 125 can extend circumferentially over a segment 162 of the upper portion 130. The illustrated first protrusion 125 comprises a first arc segment that extends circumferentially around the boundary surface 120 by approximately one hundred twenty degrees. In other embodiments, the first protrusion 125 can have a different configuration.

The second protrusion 127 projects from the lower portion 132 of the boundary surface 120. The second protrusion 127 can extend circumferentially over a segment 164 of the lower portion 132. The illustrated second protrusion 127 comprises a second arc segment that extends circumferentially over the boundary surface 120 by approximately one hundred twenty degrees. In other embodiments, the second protrusion 127 can have a different configuration.

The second protrusion 127 is discontinuous from the first protrusion 125. The second protrusion 127 and the first protrusion 125 are in opposing relationship to each other, being substantially evenly spaced circumferentially about the boundary surface 120. In other embodiments, the relative positioning of the first protrusion 125 and the second protrusion 127 can be varied.

The respective first protrusion 125 and second protrusion 127 of the orifices 101, 102, 103, 104 can help reduce the stresses imposed upon the nozzle body 82 by the flame front discharged from the interior chamber 95 through the orifices 101, 102, 103, 104. In embodiments, each of the orifices 101, 102, 103, 104 can have at least one protrusion with a different shape which is configured to help diminish the erosive nature of the flows travelling therethrough. In embodiments, the configuration of the orifices 101, 102, 103, 104 of the nozzle 50 can help increase the useful life of the prechamber assembly 25 including the nozzle 50 by helping to diminish the deleterious effects caused by the passage of the fuel/air mixture through the orifices 101, 102, 103, 104.

Figure 4:
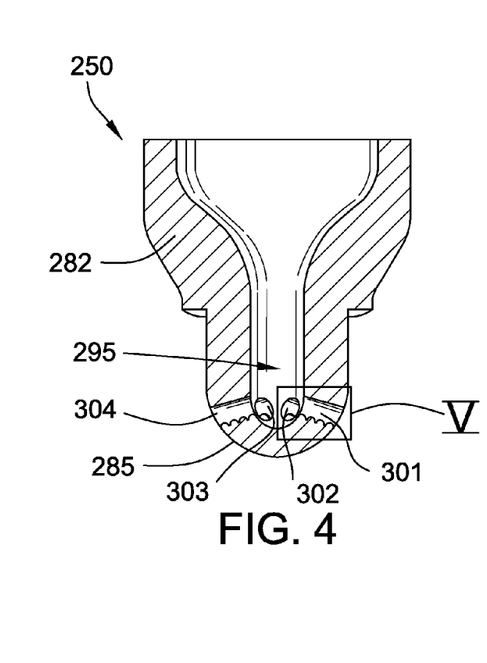
FIG. 4 is a diagrammatic, longitudinal cross-sectional view of another embodiment of a nozzle constructed in accordance with principles of the present disclosure, the nozzle being suitable for use in embodiments of a prechamber assembly following principles of the present disclosure.
Figure 5:
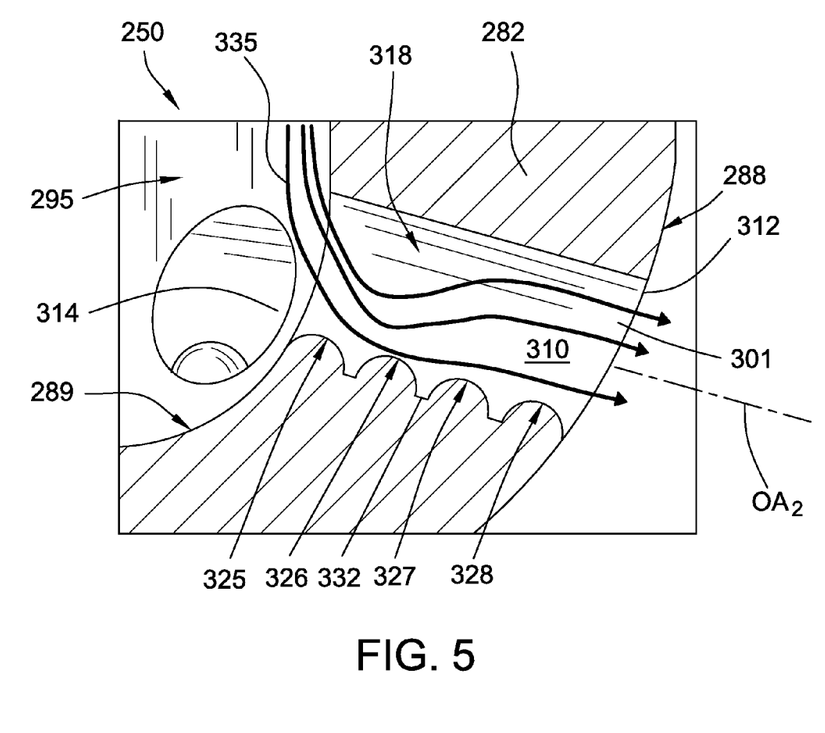
FIG. 5 is an enlarged, detail view of the nozzle of FIG. 4, as indicated by rectangle V in FIG. 4.
Figure 6:
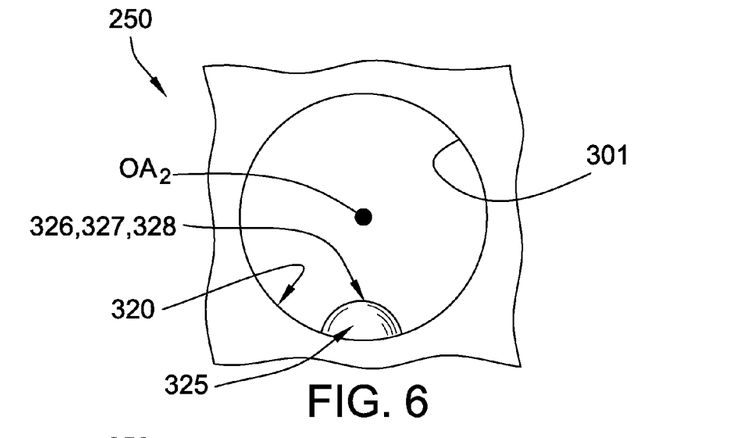
FIG. 6 is an axial end view of an orifice of the nozzle of FIG. 4, taken from an interior chamber of the nozzle.

Referring to FIGS. 4-6, another embodiment of a nozzle 250 constructed in accordance with principles of the present disclosure is shown. The nozzle 250 is suitable for use in a fuel system having a prechamber assembly constructed in accordance with principles of the present disclosure. Referring to FIG. 4, the nozzle 250 includes a nozzle body 282 that defines a plurality of orifices 301, 302, 303, 304 in a distal tip 285 of the nozzle body 282. The orifices 301, 302, 303, 304 are in communication with an interior chamber 295 defined by the nozzle body 282 and with the main combustion chamber 30 when the prechamber assembly 25 is installed in the cylinder head 24. The orifices 301, 302, 303, 304 of the nozzle body 282 are substantially the same. Accordingly, it will be understood that the description of one orifice 301 is applicable to the other orifices 302, 303, 304, as well.

Referring to FIG. 5, the nozzle body 282 includes an orifice surface 310 that defines the orifice 301. The orifice surface 310 defines an orifice passage 318 extending between, and in communication with, an outer opening 312 defined by an outer surface 288 of the nozzle body 282 and an inner opening 314 defined by an inner surface 289 of the nozzle body 282. The orifice passage 318 is in communication with the interior chamber 295 via the inner opening 314. The orifice passage 318 extends along a second orifice axis $OA_2$ between the inner opening 314 and the outer opening 312.

The orifice surface 310 includes a boundary surface 320 and a plurality of protrusions 325, 326, 327, 328. The illustrated boundary surface 320 is generally cylindrical and comprises a symmetric surface of revolution about the second orifice axis $OA_2$. Each of the plurality of protrusions 325, 326, 327, 328 projects from a lower portion 332 of the boundary surface 320 radially inwardly into the orifice passage 318. The plurality of protrusions 325, 326, 327, 328 is in spaced relationship to each other along the orifice axis $OA_2$.

The illustrated plurality of protrusions 325, 326, 327, 328 is in substantially evenly-spaced relationship to each other along the orifice axis $OA_2$. In other embodiments, the spacing between at least two adjacent protrusions can be different from the spacing between at least one other pair of adjacent protrusions in the orifice along the orifice axis. The illustrated plurality of protrusions 325, 326, 327, 328 extends along the second orifice axis $OA_2$ substantially between the inner opening 314 and the outer opening 312.

The illustrated nozzle 250 includes four protrusions 325, 326, 327, 328 in each of the orifices 301, 302, 303, 304. In other embodiments, a different number of protrusions can be provided.

Referring to FIGS. 5 and 6, each of the plurality of protrusions 325, 326, 327, 328 comprises a convex spherical portion. Each of the protrusions 325, 326, 327, 328 is configured to divert a flow 335 of a fuel mixture/flame front entering the orifice passage 318 radially away from the boundary surface 320. The protrusions 325, 326, 327, 328 are configured to help diminish the erosive nature of the flows travelling through the orifice 301.

In embodiments, at least one of the protrusions 325, 326, 327, 328 can be elongated along the orifice axis $OA_2$ to form a half-capsule shape. In yet other embodiments, at least one of the protrusions 325, 326, 327, 328 can have an ellipsoid shape. In some of such embodiments, at least one of the protrusions 325, 326, 327, 328 having an ellipsoid shape with its major axis extending in a direction substantially along the orifice axis $OA_2$.

Referring to FIG. 6, the plurality of protrusions 325, 326, 327, 328 is generally circumferentially aligned with respect to each other about the boundary surface 320. In other embodiments, at least one of the protrusions 325, 326, 327, 328 can be circumferentially offset with respect to at least one other of the protrusions 325, 326, 327, 328. The nozzle 250 of FIGS. 4-6 is similar in other respects to the nozzle 50 of FIGS. 1-3.

Figure 7:
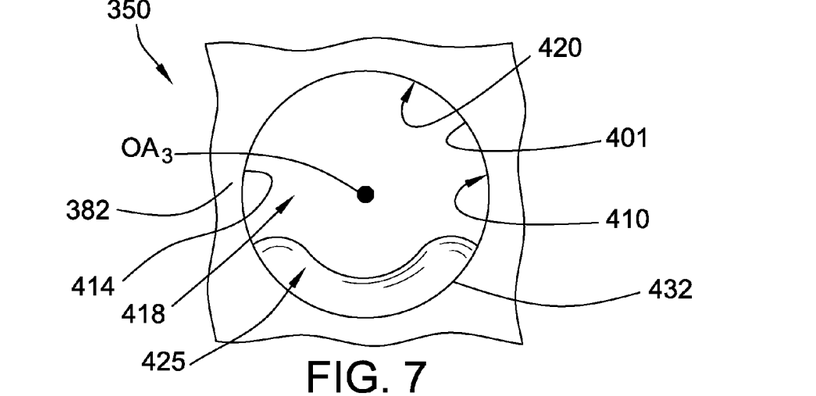
FIG. 7 is an axial end view, as in FIG. 6, of another embodiment of a nozzle constructed in accordance with principles of the present disclosure, the nozzle being suitable for use in embodiments of a prechamber assembly following principles of the present disclosure.

Referring to FIG. 7, in other embodiments, a nozzle 350 constructed in accordance with principles of the present disclosure can include at least one orifice 401 having a protrusion 425 that comprises a torus segment. The illustrated nozzle 350 is suitable for use in a fuel system having a prechamber assembly constructed in accordance with principles of the present disclosure.

The nozzle 350 includes a nozzle body 382 that defines the orifice 401. In embodiments, the nozzle body 382 can include a plurality of orifices arranged circumferentially about the nozzle body 382, each being substantially the same as the orifice 401 shown in FIG. 7.

The nozzle body 382 includes an orifice surface 410 that defines an orifice passage 418 of the orifice 401. The orifice surface 410 can include a boundary surface 420 and at least the protrusion 425 which projects from the boundary surface 420 radially inwardly into the orifice passage 418. The illustrated boundary surface 420 is generally cylindrical and comprises a symmetric surface of revolution about a third orifice axis $OA_3$.

The illustrated protrusion 425 is disposed in a lower portion 432 of the boundary surface 420 adjacent an inner opening 414 and comprises a torus segment that extends circumferentially around the boundary surface 420 by approximately one hundred twenty degrees. The protrusion 425 is configured to divert a flow of a fuel mixture/flame front entering the orifice passage 418 radially away from the boundary surface 420. The protrusion 425 is configured to help diminish the erosive nature of the flows travelling through the orifice 401.

In other embodiments, the protrusion 425 can be located in a different circumferential and/or axial position, have a different size, and/or extend circumferentially around the boundary surface 420 by a different amount. In embodiments, the orifice surface 410 can include a plurality of protrusions, each being substantially the same as the protrusion 425 shown in FIG. 7 and disposed in spaced relationship to each other along the orifice axis $OA_3$ defined by the orifice surface 410. The nozzle 350 of FIG. 7 can be similar in other respects to the nozzle 250 of FIGS. 4-6.

Figure 8:
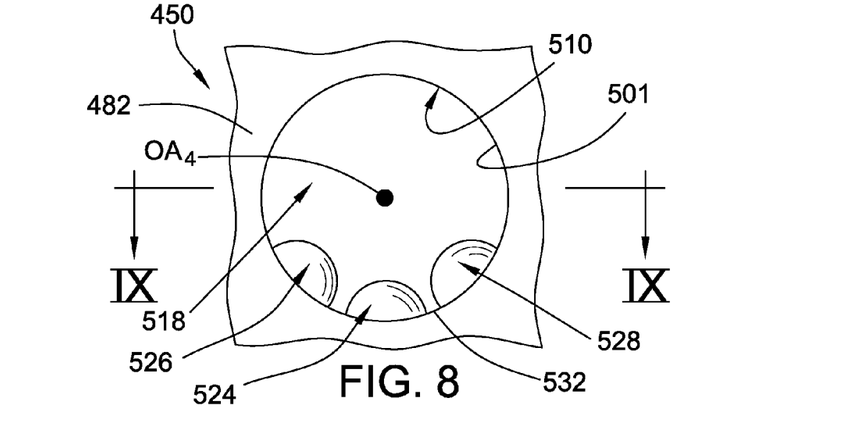
FIG. 8 is an axial end view, as in FIG. 6, of still another embodiment of a nozzle constructed in accordance with principles of the present disclosure, the nozzle being suitable for use in embodiments of a prechamber assembly following principles of the present disclosure.
Figure 9:
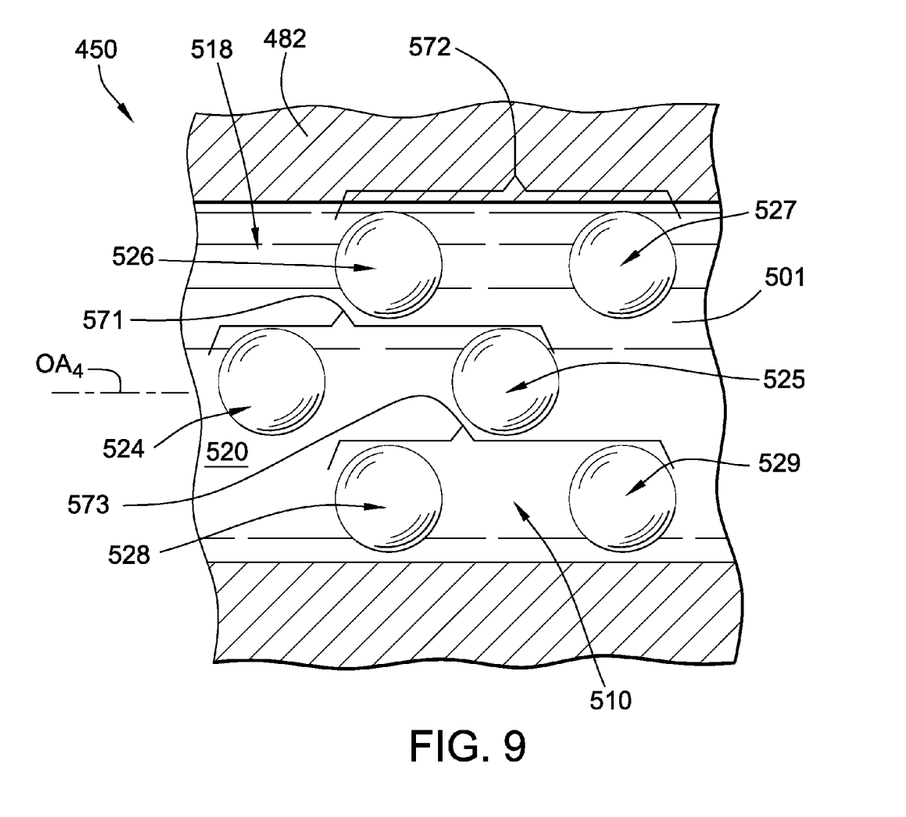
FIG. 9 is a partial axial cross-sectional view of an orifice of the nozzle of FIG. 8 taken along line IX-IX in FIG. 8.

Referring to FIGS. 8 and 9, in other embodiments, a nozzle 450 constructed in accordance with principles of the present disclosure can include at least one orifice 501 having a plurality of protrusions 524, 525, 526, 527, 528, 529 wherein at least one of the protrusions 524, 525, 526, 527, 528, 529 is circumferentially offset with respect to at least one other of the plurality of the protrusions 524, 525, 526, 527, 528, 529 about a boundary surface 520 of the orifice 501. The illustrated nozzle 450 is suitable for use in a fuel system having a prechamber assembly constructed in accordance with principles of the present disclosure.

The nozzle 450 includes a nozzle body 482 that defines the orifice 501. In embodiments, the nozzle body 482 can include a plurality of orifices arranged circumferentially about the nozzle body 482, each being substantially the same as the orifice 501 shown in FIGS. 8 and 9.

The nozzle body 482 includes an orifice surface 510 that defines an orifice passage 518 of the orifice 501. The orifice surface 510 includes the boundary surface 520 and the protrusions 524, 525, 526, 527, 528, 529 which each projects from the boundary surface 520 radially inwardly into the orifice passage 518. The illustrated boundary surface 520 is generally cylindrical and comprises a symmetric surface of revolution about a fourth orifice axis $OA_4$.

The illustrated protrusions 524, 525, 526, 527, 528, 529 project from a lower portion 532 of the boundary surface 520. Referring to FIGS. 8 and 9, each of the plurality of protrusions 524, 525, 526, 527, 528, 529 comprises a convex spherical portion. Each of the protrusions 524, 525, 526, 527, 528, 529 is configured to divert a flow of a fuel mixture/flame front entering the orifice passage 518 radially away from the boundary surface 520. The protrusions 524, 525, 526, 527, 528, 529 are configured to help diminish the erosive nature of the flows travelling through the orifice 501.

Referring to FIG. 9, in the illustrated embodiment, the protrusions 524, 525, 526, 527, 528, 529 are arrayed in three rows 571, 572, 573 of protrusions 524, 525; 526, 527; 528, 529, respectively, which are in alternating, offset axial relationship with each other along the fourth orifice axis $OA_4$. The respective protrusions 524, 525; 526, 527; 528, 529 of each row 571, 572, 573 are circumferentially aligned with each other about the boundary surface 520, as shown in FIGS. 8 and 9. Referring to FIG. 9, the protrusions 526, 527; 528, 529 of the outer rows 572, 573 are respectively axially aligned with each other along the fourth orifice axis $OA_4$. The intermediate row 571 is disposed between the outer rows 572, 573. The protrusions 524, 525 of the intermediate row 571 are respectively offset axially with respect to the protrusions 526, 527; 528, 529 of the outer rows 572, 573 along the fourth orifice axis $OA_4$. In other embodiments, the protrusions 524, 525, 526, 527, 528, 529 can be disposed in a different array pattern. In other embodiments, the protrusions 524, 525, 526, 527, 528, 529 can be located in a different circumferential and/or axial position, have a different size, and/or have a different shape. The nozzle 450 of FIG. 8 is similar in other respects to the nozzle 250 of FIGS. 4-6.

It will be apparent to one skilled in the art that various aspects of the disclosed principles relating to prechamber assemblies may be used with a variety of engines. Accordingly, one skilled in the art will understand that, in other embodiments, an engine following principles of the present disclosure can include different components and can take on different forms.

Figure 10:
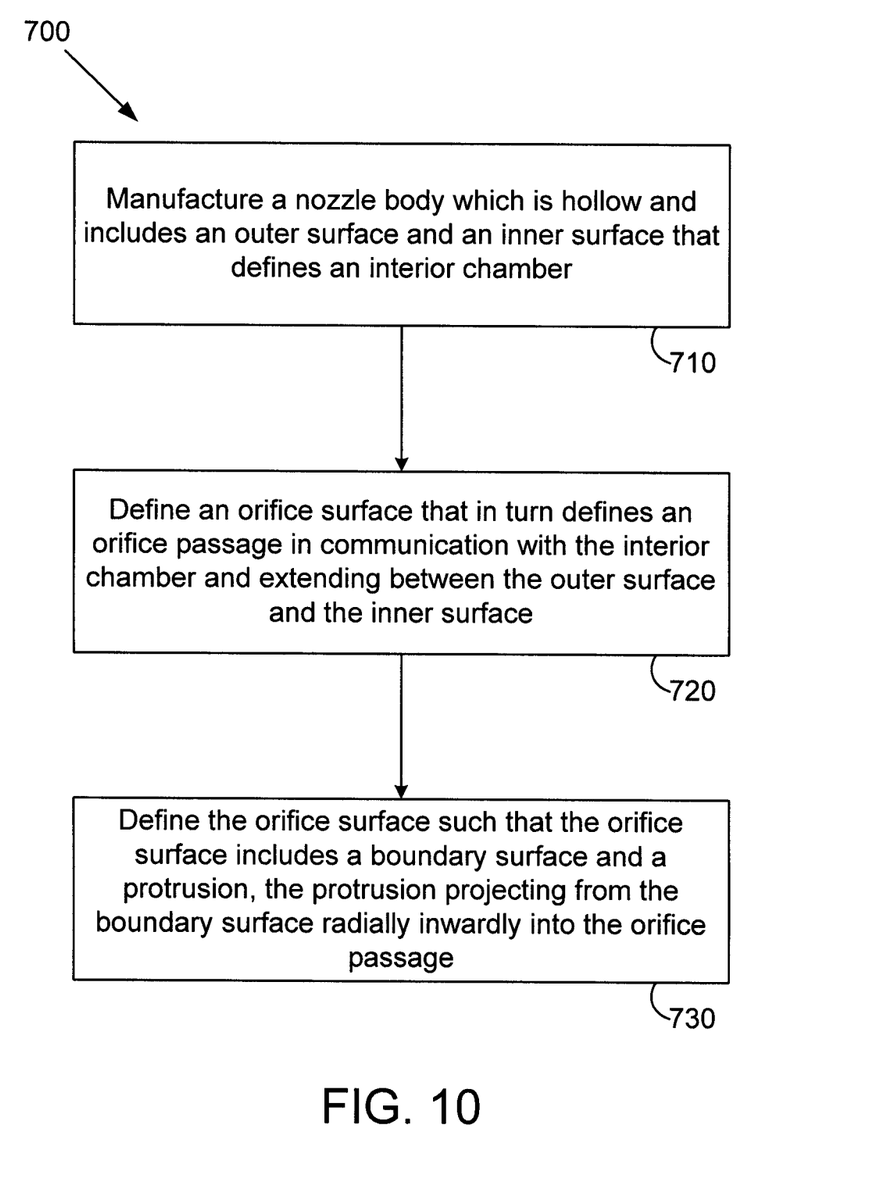
FIG. 10 is a flowchart illustrating steps of an embodiment of a method of making a nozzle for a member of a fuel combustion system of an engine following principles of the present disclosure.

Referring to FIG. 10, steps of an embodiment of a method 700 of making a nozzle for a member of a fuel combustion system of an engine following principles of the present disclosure are shown. In embodiments, a method of making a nozzle for a member of a fuel combustion system of an engine following principles of the present disclosure can be used to make any embodiment of a nozzle according to principles of the present disclosure.

The illustrated method 700 of making a nozzle includes manufacturing a nozzle body (step 710). The nozzle body is hollow and includes an outer surface and an inner surface. The outer surface defines an outer opening. The inner surface defines an interior chamber and an inner opening. In embodiments, the nozzle body is manufactured from a suitable material, such as a metal alloy. In some embodiments, the nozzle body is made from a nickel alloy.

An orifice surface is defined (step 720). The orifice surface defines an orifice passage extending between, and in communication with, the outer opening and the inner opening. The orifice passage is in communication with the interior chamber via the inner opening.

The orifice surface is defined such that the orifice surface includes a boundary surface and a protrusion (step 730). The protrusion projects from the boundary surface radially inwardly into the orifice passage.

In embodiments, the nozzle body is manufactured and each orifice surface is defined via additive manufacturing (also sometimes referred to as "additive layer manufacturing" or "3D printing"). In embodiments, any suitable additive manufacturing equipment can be used. For example, in embodiments, a production 3D printer commercially available under the under the brand name ProX™ 200 from 3D Systems, Inc. of Rock Hill, S.C., can be used.

In embodiments, the nozzle body is manufactured using additive manufacturing such that the nozzle body includes a body wall portion. The body wall portion includes the boundary surface. The body wall portion circumscribes the orifice passage and extends between the inner surface and the outer surface. The body wall portion can be made from a first material having a first thermal resistance value. The orifice surface can be defined using additive manufacturing such that the protrusion is made from a second material having a second thermal resistance value. In embodiments, the second thermal resistance value is greater than the first thermal resistance value.

In embodiments, the orifice surface is defined such that the protrusion is configured to divert a flow of a fuel mixture/flame front entering the orifice passage radially away from the boundary surface. In embodiments, the flow of the fuel mixture/flame front comprises at least one of an ignited fuel mixture for a prechamber assembly and a fuel-injector fuel mixture for a fuel injector.

In embodiments, the shape of the protrusion is based upon the flow of the fuel mixture/flame front through a geometric representation of at least one baseline orifice passage is iteratively modeled to define a shape of the protrusion. In embodiments, modeling is performed that analyzes the flow of the fuel mixture/flame front through a geometric representation of at least one baseline orifice passage and at least two different protrusions having different configurations. The baseline orifice passage can be defined by a projection of the boundary surface between the outer opening and the inner opening without any protrusions therein. The protrusion of the orifice surface has a shape based upon the modeling. Any suitable modeling technique, such as, computational fluid dynamics, for example, can be used to model an expected flow path of a flow of fuel mixture/flame front through the baseline orifice passage. In embodiments, the shape of at least one projection can be configured to include a protrusion passage surface that substantially conforms to the expected flow path of the flow of the fuel mixture/flame front at the location of that projection through at least one baseline orifice passage. In other embodiments, the shape of at least one projection can be configured to include a protrusion passage surface that is configured to divert the flow of the fuel mixture/flame front entering the orifice passage radially away from the boundary surface.

INDUSTRIAL APPLICABILITY

The industrial applicability of the embodiments of fuel combustion systems, nozzles for a member of a fuel combustion system of an engine, and methods of making nozzles for a member of a fuel combustion system of an engine as described herein will be readily appreciated from the foregoing discussion. In embodiments, a nozzle constructed according to principles of the present disclosure can be used in a suitable member of a fuel combustion system of an engine, such as, a fuel injector or a prechamber assembly, for example. Embodiments of a nozzle and/or a fuel combustion system according to principles of the present disclosure may find potential application in any suitable engine. Exemplary engines include those used in electrical generators and pumps, for example.

For example, in internal combustion engines, above a particular capacity, the energy of an ignition spark may no longer be sufficient to ignite reliably the combustion gas/air mixture, which for emissions reasons is often very lean, in the main combustion chamber. To increase the ignition energy, a prechamber assembly constructed according to principles of the present disclosure can be connected to the cylinder head and placed in communication with the main combustion chamber via a plurality of orifices defined in the nozzle. A small part of the mixture is enriched with a small quantity of combustion gas or an additional fuel and ignited in the precombustion chamber. Flame propagation, i.e. ignition kernel, is transferred to the main combustion chamber by way of the orifices in the nozzle and the flame propagation ignites the lean fuel mixture. The flame pattern emitting from the nozzle is advantageous because it has a hot surface area that can ignite even extremely lean or diluted combustible mixtures in a repeatable manner.

Embodiments of a nozzle constructed according to principles of the present disclosure can have an orifice configuration that helps to reduce the heat transfer between a flow of fuel mixture/flame front passing through the respective orifice of the nozzle and the nozzle body and to reduce the temperature within the orifice passages and the orifice bridges disposed around the nozzle body. In embodiments, the nozzle can include an orifice surface having at least one protrusion configured to modify a flow of a fuel mixture/flame front passing through the orifice passage defined by the orifice surface to help reduce at least one of the temperature within the orifice passage and the heat transfer between the flow of a fuel mixture/flame front and the boundary surface of the orifice surface.

In embodiments, a nozzle constructed according to principles of the present disclosure can include an orifice surface having a boundary surface and a protrusion where the protrusion projects from the boundary surface radially inwardly into the orifice passage. By introducing a rippled surface in the orifice, fluid detachment can occur, thereby reducing the overall heat transfer between the flow of fuel and the boundary surface and reducing the temperature at the boundary surface.

The improved heat transfer characteristics can help reduce the amount of heat-induced damage suffered by the nozzle body during operation. The orifices of the nozzle can be configured to help increase the useful life of the nozzle.

Embodiments of a nozzle constructed according to principles of the present disclosure can be made using additive manufacturing techniques. The protrusions in the orifices can be made using additive manufacturing techniques from a material having a higher thermal resistance value than the material used to make the surrounding body wall portion. The higher thermal resistance of the protrusions can increase their useful life and help them withstand the ablative nature of the flows of fuel mixture/flame front passing through the orifices.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A nozzle for a member of a fuel combustion system of an engine, the nozzle comprising:
a nozzle body, the nozzle body being hollow and including an outer surface, an inner surface, and an orifice surface, the outer surface defining an outer opening, the inner surface defining an interior chamber and an inner opening, and the orifice surface defining an orifice passage extending between, and in communication with, the outer opening and the inner opening, the orifice passage being in communication with the interior chamber via the inner opening; and
wherein the orifice surface includes a boundary surface and a protrusion disposed adjacent the inner opening, the protrusion projecting from the boundary surface radially inwardly into the orifice passage, and wherein the protrusion is configured to divert a flow of a fuel mixture/flame front entering the orifice passage from the inner opening radially away from the boundary surface.

2. The nozzle according to claim 1, wherein the boundary surface is generally cylindrical and has a lower portion and an upper portion, and the protrusion projects from the upper portion of the boundary surface.

3. The nozzle according to claim 2, wherein the protrusion extends circumferentially over a segment of the upper portion.

4. The nozzle according to claim 3, wherein the protrusion includes a first inclined surface and a second inclined surface, the first inclined surface and the second inclined surface in converging relationship to each other and defining a ridge, the first inclined surface extending between the inner opening and the ridge and inclined away from the boundary surface moving from the inner opening to the ridge, the second inclined surface extending between the ridge and the boundary surface at an intermediate edge thereof, the second inclined surface inclined toward the boundary surface moving from the ridge to the intermediate edge.

5. The nozzle according to claim 1, wherein the protrusion comprises a first protrusion, and the nozzle further comprises:
   a second protrusion, the second protrusion projecting from the boundary surface radially inwardly into the orifice passage, the second protrusion being discontinuous from the first protrusion.

6. The nozzle according to claim 5, wherein the boundary surface is generally cylindrical and has a lower portion and an upper portion, the first protrusion projects from the upper portion of the boundary surface, the second protrusion projects from the lower portion of the boundary surface, and the second protrusion includes a convex surface and a concave surface, the convex surface disposed adjacent the inner opening, and the concave surface disposed axially outward of the convex surface from the inner opening toward the outer opening.

7. The nozzle according to claim 1, wherein the boundary surface is generally cylindrical and has a lower portion and an upper portion, and the protrusion projects from the lower portion of the boundary surface.

8. The nozzle according to claim 7, wherein the protrusion comprises a convex spherical portion.

9. The nozzle according to claim 7, wherein the protrusion comprises a torus segment.

10. The nozzle according to claim 7, wherein the protrusion is one of a plurality of protrusions, each of the plurality of protrusions projecting from the boundary surface radially inwardly into the orifice passage.

11. The nozzle according to claim 10, wherein at least one of the plurality of protrusions is circumferentially offset with respect to at least one other of the plurality of protrusions about the boundary surface.

12. The nozzle according to claim 10, wherein the orifice passage extends along an orifice axis, and the plurality of protrusions is generally circumferentially aligned with respect to each other about the boundary surface and is in spaced relationship to each other along the orifice axis.

13. The nozzle according to claim 12, wherein the plurality of protrusions extends along the orifice axis substantially between the inner opening and the outer opening.

* * * * *